United States Patent [19]

Miyashita et al.

[11] Patent Number: 4,583,214
[45] Date of Patent: Apr. 15, 1986

[54] KEY TELEPHONE TRANSMISSION SYSTEM

[75] Inventors: Hiroyuki Miyashita, Koganei; Akira Hirato, Ebina; Yoshihiro Kawata, Saitama, all of Japan

[73] Assignee: Iwasaki Tsushinki Kabushiki Kaisha, Tokyo, Japan

[21] Appl. No.: 591,191

[22] Filed: Mar. 16, 1984

[30] Foreign Application Priority Data

Mar. 17, 1983 [JP] Japan ................................. 58-43233

[51] Int. Cl.$^4$ ............................................. H04L 5/20
[52] U.S. Cl. .................................... 370/5; 179/99 M
[58] Field of Search ............ 370/5; 179/99 R, 99 LC, 179/99 LS, 99 M

[56] References Cited

U.S. PATENT DOCUMENTS 4,173,414 11/1979 Bloch et al. ............................. 370/5
4,203,011 5/1980 Coviello ................................. 370/5

FOREIGN PATENT DOCUMENTS 53-119606 10/1978 Japan .............................. 179/99 M Primary Examiner—Douglas W. Olms
Attorney, Agent, or Firm—Robert E. Burns; Emmanuel J. Lobato; Bruce L. Adams

[57] ABSTRACT

A transmission system for a key telephone system, in which speech signals and control signals are transmitted through two pairs of transmission conductors between a key service unit and each of a plurality of key telephone sets, and in which DC electric power is supplied from the key service unit to each of a plurality of telephone sets. In accordance with the present invention, the speech signal and the control signal are transmitted through a first transmission line of high frequency band provided by one pair of the transmission conductors from the key telephone set to the key service unit, and the speech signal and the control signal are transmitted through a second transmission line of high frequency band provided by the other pair of the transmission conductors from the key service unit to the key telephone set. A third transmission channel is provided by the use of respective neutral points of the two pairs of transmission conductors established at the key service unit and by the use of respective neutral points of the two pairs of transmission conductors established at the key service unit to form a voice-frequency two-way transmission line between the key service unit and the key telephone set. DC electric power is supplied from the key service unit to the voice-frequency two-way transmission line from a DC power source, so that the DC electric power supplied is separated from the voice-frequency two-way transmission line by a power separating circuit, such as a smoothing circuit.

2 Claims, 2 Drawing Figures

KEY SERVICE UNIT

KEY TELEPHONE SET

KEY TELEPHONE TRANSMISSION SYSTEM

BACKGROUND OF THE INVENTION

The present invention relates to a key telephone transmission system in which a power supply line, two speech paths and a control signal path are formed by four wires.

In recent years, attempts have been made to reduce the number of cable conductors of a key telephone system but, with the progress of the key telephone system, transmission and reception of more signals have become necessary between key telephone sets and the key service unit. The signals to be transmitted and received are a speech signal, a control signal and a power supply and, for transmitting them with a four-conductor line, various arrangements are employed. For example, two conductors are used for transmitting the speech signal and the power source and the other two conductors are used for the control signal, or two conductors are used only for the speech signal and the other two conductors are for the power supply and the control signal.

In general, the key telephone transmission system is selected from the viewpoints of whether or not it possesses required transmission performance and whether or not it permits simplification of hardware for the terminal equipments of subscriber's lines and key telephone sets.

On the other hand, there has been proposed, as a result of improved function of the key telephone system, such an arrangement that has one more speech path, that is, employs six conductors, and uses one of the speech path for an ordinary calls and the other as an auxiliary speech path. With the provision of this second speech path, it is possible to very smoothly perform such a function as a camp-on function through using the calling party's voice instead of a mere tone signal. However, an increase in the number of transmitted and received signals is inconsistent with the reduction of the number of cable conductors used.

SUMMARY OF THE INVENTION

It is an object of the present invention to provide a key telephone transmission system which is adapted for higher transmission efficiency through the use of a transmission system which is constituted by two transmission conductors for transmitting a PCM digital speech sending signal and a control signal and by two reception conductors for receiving a PCM speech receiving signal and a control signal and by superimposing, as a second channel, on these two kinds of signal lines an analog signal having superimposed thereon the power supply.

BRIEF DESCRIPTION OF THE DRAWINGS

The present invention will be described in detail below with reference to the accompanying drawings, in which.

DETAILED DESCRIPTION

Figure 1:
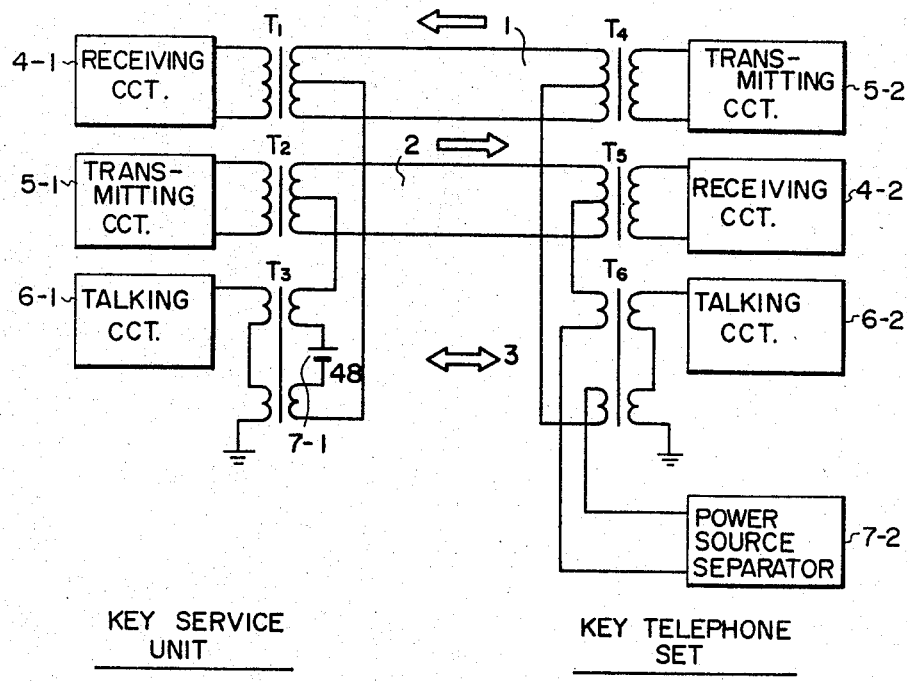
FIG. 1 is a block diagram illustrating an embodiment of the present invention.

With reference to FIG. 1, reference numeral 1 indicates a transmission line (first transmission line); 2 designates a reception line (second transmission line); 3 identifies a third transmission line; 4-1 and 4-2 denote first and second receiving circuits; 5-1 and 5-2 represent first and second transmitting circuits; 6-1, 6-2 show first and second talking circuits; 7-1 refers to a battery; and 7-2 signifies a power supply separator comprising a smoothing circuit.

That is, the present invention is directed to a key telephone transmission system which performs transmission and reception of a speech signal and a control signal between a key service unit and a plurality of telephone sets over two pairs of transmission lines 1 and 2 and supplies power from the key service unit to the telephone sets. The transmitting circuit 5-2 and the receiving circuit 4-2 of each telephone set are connected via two transformer $T_4$ (first transformer) and $T_5$ (fourth transformer) to the two transmission lines 1 and 2, respectively. The receiving circuit 4-1 and the transmitting circuit 5-1 of the key service unit are connected via two transformers $T_1$ (second transformer) and $T_2$ (third transformer) to the two transmission lines 1 and 2, respectively. Thus, transmission lines of high-frequency band exceeding the voice frequency band are respectively formed from the telephone set to the key service unit and from the latter to the former. The other talking circuit 6-2 is connected to the secondary side of a transformer $T_6$ (sixth transformer), the primary side terminals of which are connected to the center taps of the aforesaid two transformers $T_4$ and $T_5$, respectively, and which includes the power source separator 7-2. Further, the other talking circuit 6-1 of the key service unit is connected to the primary side of a transformer $T_3$ (fifth transformer), the secondary side terminals of which are connected to the center taps of the aforesaid two transformers $T_1$ and $T_2$, respectively, and which includes the power sending means 7-1. Thus, power is supplied from a direct-current source 7-1 employed as power sending means to the power source separator 7-2 employed as power separating means and, further, a voice-frequency two-way transmission line is formed between the talking circuit 6-1 of the key service unit and the talking circuit 6-2 of the telephone set.

Next, a description will be given of the operation of this embodiment. A talking signal and a control signal both in digital form are transmitted over the transmission lines 1 and 2, and an analog signal superimposed on the power source is transmitted over the transmission line 3. In this case, the digital signals on the transmission lines 1 and 2 leak to the analog signal line 3 because of imbalance between the transformers $T_1$, $T_2$ and between transformers $T_4$, $T_5$. However, since the transmission rate on the digital transmission lines 1 and 2 is 64 Kilobits/second or more and since the band of the analog signal line is 4 KHz, the spectra of the digital signals are mostly outside the band of the analog signal line and, therefore, quality deterioration of the analog signal line does not matter.

Figure 2:
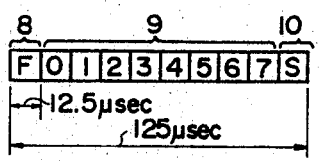
FIG. 2 shows an example of a signal format for use in the present invention.

FIG. 2 shows an example of the transmission format of the digitized speech signal and control signal, which will be described in brief. Reference numeral 8 indicates a frame pulse, 9 bits for speech signals and 10 a bit for a control signal. This format includes the speech signal and the control signal digitized at a repetition frequency of 80 KHz, and one frame is transmitted with a period of 8 KHz.

As described above, the digital signals and the speech signal on the transmission line 3 are isolated with practically no bad influence, so that this system is advantageous for improving the function of the key telephone system.

As has been described in the foregoing, the present invention superimposes the power supply and the second speech signal through utilization of the data transmission and reception lines and does not need more than four lines, and hence possesses the advantage that the existing private cable can be used.

What we claim is:

1. A key telephone transmission system provided between a key service unit, and a respective key telephone set, comprising:

a first transmission line of high frequency exceeding a voice frequency band provided as one pair of transmission conductors, a first transformer having a secondary winding connected at the key telephone set to the one pair of transmission conductors, and a second transformer having a primary winding connected at the key service unit to the one pair of transmission conductors so as to couple to the first transformer through the one pair of transmission conductors;

a first transmission circuit at the key telephone set connected to the primary winding of the first transformer for transmitting a speech signal and a control signal from the key telephone set to the key service unit;

a first receiving circuit connected at the key service unit to a secondary winding of the second transformer for receiving the speech signal and the control signal transmitted from the key telephone set;

a second transmission line of high frequency exceeding a voice frequency band provided as another pair of transmission conductors, a third transformer having a secondary winding connected at the key service unit to said another one pair of transmission conductors, and a fourth transformer having a primary winding connected at the key telephone set to said another one pair of transmission lines so as to couple to the third transformer through said another one pair of transmission lines;

a second transmission circuit connected at the key service unit to the primary winding of the third transformer for transmitting a speech signal and a control signal from the key service unit to the key telephone set;

a second receiving circuit connected at the key telephone set to a secondary winding of the fourth transformer for receiving the speech signal and the control signal transmitted from the key service unit;

a third transmission line of voice frequency band and power supply provided by a fifth transformer and a sixth transformer, a secondary winding of the fifth transformer being connected to respective neutral points of the primary winding of the second transformer and the secondary winding of the third transformer, a primary winding of the sixth transformer being connected to respective neutral points of the secondary winding of the first transformer and the primary winding of the fourth transformer;

a first talking circuit connected at the key service unit to a primary winding of the fifth transformer;

a second talking circuit connected at the key telephone set to a secondary winding of the sixth transformer;

DC power supply means included in the secondary winding of the fifth transformer to supply DC electric power to the key telephone set; and DC power separating means included in the primary winding of the sixth transformer to separate the DC electric power supplied from the DC power supply means.

2. A key telephone transmission system according to claim 1, in which the first transmission circuit and the second transmission circuit apply the speech signal having a PCM digital signal format at the first transmission line and the second transmission line respectively.

* * * * *